United States Patent
Traina et al.

(10) Patent No.: US 12,103,131 B2
(45) Date of Patent: Oct. 1, 2024

(54) METHOD OF MINIMAL STRESS INDUCING OPHTHALMIC LENS BLOCKING

(71) Applicant: NCRx Optical Solutions, Inc, Pittsburgh, PA (US)

(72) Inventors: John Traina, Pittsburgh, PA (US); Jeremy Lehning, Vernon, CT (US); Edward L. McCall, Sewickley, PA (US); William G. Moul, Jr., Bradfordwoods, PA (US)

(73) Assignee: NCRX OPTICAL SOLUTIONS, INC, Pittsburgh, PA (US)

( * ) Notice: Subject to any disclaimer, the term of this patent is extended or adjusted under 35 U.S.C. 154(b) by 1228 days.

(21) Appl. No.: 16/826,567

(22) Filed: Mar. 23, 2020

(65) Prior Publication Data

US 2020/0301168 A1    Sep. 24, 2020

Related U.S. Application Data

(60) Provisional application No. 62/821,537, filed on Mar. 21, 2019.

(51) Int. Cl.
*B24B 13/005* (2006.01)
*B29D 11/00* (2006.01)

(52) U.S. Cl.
CPC ........ *B24B 13/0055* (2013.01); *B24B 13/005* (2013.01); *B24B 13/0052* (2013.01); *B24B 13/0057* (2013.01); *B29D 11/00009* (2013.01)

(58) Field of Classification Search
CPC ..... B24D 11/00009; B24B 9/08; B24B 9/107; B24B 9/14; B24B 9/142; B24B 9/144
USPC .......... 351/159.73, 178; 65/37, 42; 451/384, 451/390, 364
See application file for complete search history.

(56) References Cited

U.S. PATENT DOCUMENTS

| 5,885,700 A | * | 3/1999 | Weldon ............... B24B 13/0057 428/424.8 |
| 2005/0173046 A1 | * | 8/2005 | Savoie .................. B24B 13/005 156/101 |

* cited by examiner

*Primary Examiner* — Travis S Fissel
(74) *Attorney, Agent, or Firm* — Blynn L. Shideler; Krisanne Shideler; BLK Law Group

(57) ABSTRACT

A method and associated implementing system eliminates much of the stress presently introduced by the bonding of ophthalmic lens blanks, or blanks to a holding device, namely a metal block. The method of attaching ophthalmic lens blanks to a blocking assembly comprises the steps of shaping a blocking assembly to take the shape of an ophthalmic lens blank surface of an ophthalmic lens, wherein the blocking assembly is not attached directly to the ophthalmic lens blank during shaping of the blocking assembly; and following the shaping of the blocking assembly, attaching the lens blank to the shaped blocking assembly.

14 Claims, 3 Drawing Sheets

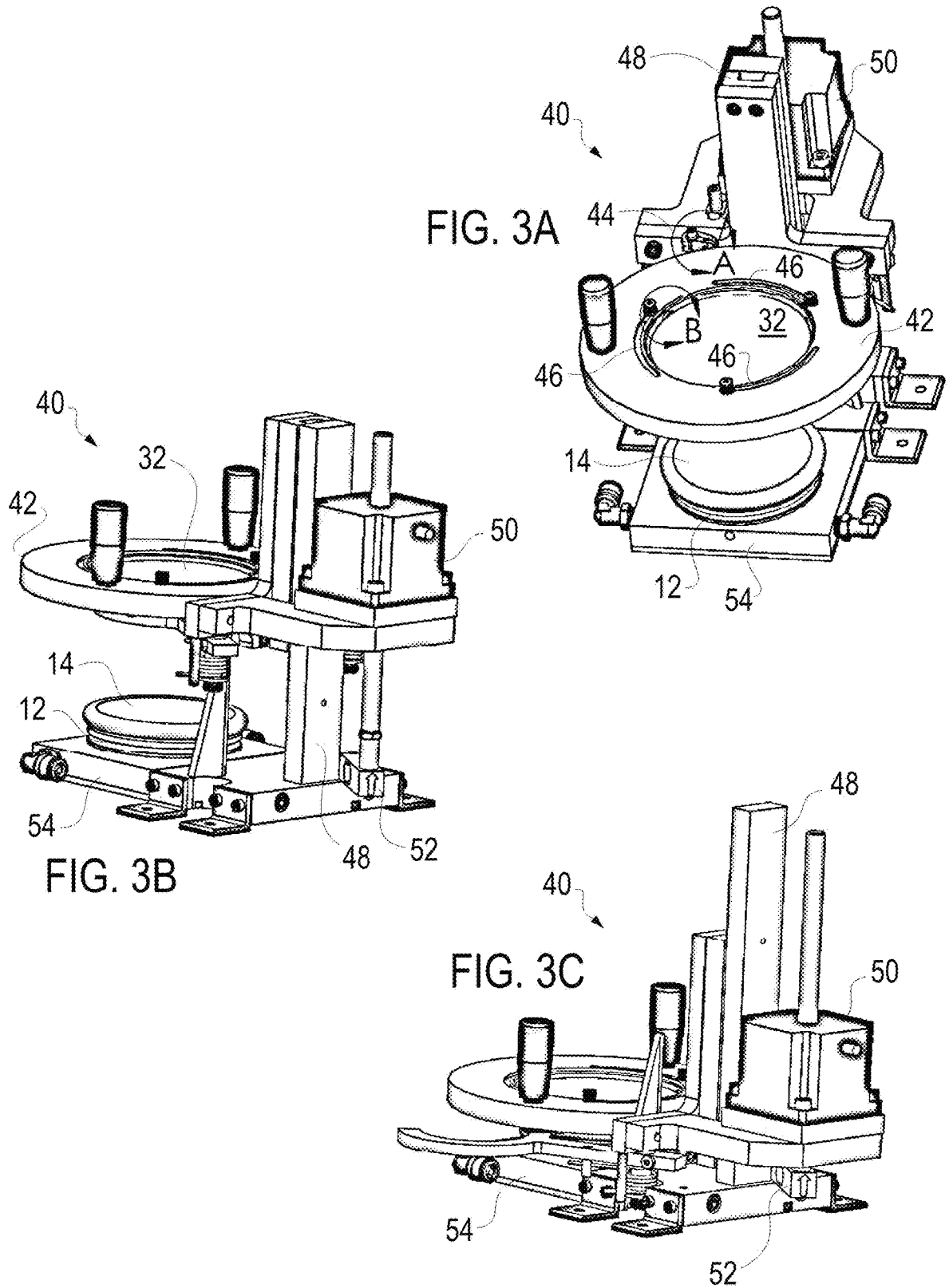

METHOD OF MINIMAL STRESS INDUCING OPHTHALMIC LENS BLOCKING

RELATED APPLICATIONS

This application claims priority to U.S. patent application Ser. No. 62/821,537 filed Mar. 21, 2019 titled "Minimal Stress Inducing Lens Blocking System and Method."

BACKGROUND INFORMATION

1. Field of the Invention

The present invention relates to lens blocking, and more particular to a minimal stress inducing ophthalmic lens blocking method and system.

2. Background Information

In the manufacturing of ophthalmic lenses, a method for holding the front side of the lens blank in preparation for surfacing on the backside of the blank is required, which is commonly called blocking or lens blocking. At present, the most common lens blocking technique is to first have a metal piece, referred to as a block, placed a specific distance from the front surface of the lens blank, then after this is done, a bonding material is then injected between the lens blank and the block. While several materials have been used for this bonding, the most common are a low melting point metal alloy and a specially formulated low melting point wax. These two materials are injected hot. The bonding or blocking material serves two functions. It holds the lens blank to the block, and it supplies lens support for the surfacing and polishing processes. The blocking material and the block and the other components that are coupled to the block can be referenced herein as a blocking assembly. Traditional surfacing will only machine the sphere and cylinder power attributes of the prescription into the back of the lens blank. More modern surfacing will lathe the entire prescription, including an "add" power for presbyopia, into the back of the lens blank. This more modern technique is referred to as "freeform surfacing".

The terms lens, lens blank and blank are used essentially interchangeably herein, unless expressly differentiated. The terms bonding material and blocking material are used interchangeably herein unless expressly differentiated, After the lens has been surfaced it will be polished. At the completion of the polishing process the lens will be removed from the blocking assembly, a process commonly called de-blocking. The bonding material will be removed from the block and recycled as part of the de-blocking process. The de-blocking process, namely the removal of the bonding or blocking material and the blocking material recycling process, is time-consuming and is prone to contaminating the laboratory with bits of the bonding material. The wax is particularly troublesome since it is difficult to remove from the finished lens.

As an indication of this problem, one of the follow-on processes in producing ophthalmic lenses is to apply an antireflective coating. For smaller laboratories this coating is normally applied by a third-party. Many of the third parties applying antireflective coatings will not accept lenses made in a laboratory that uses wax due to contamination issues affecting the coating. Those using metal alloy have less difficulty with contamination of the lenses. However, because of the types of metals used in this alloy, the metal blocking material is a hazardous substance and requires the use of personnel protective equipment and wastewater treatment to reduce employee exposure and reduce the release of the hazardous substances to the environment.

The lens blocking method has changed little since lenses were made of glass. However, with plastic lenses almost completely replacing glass ophthalmic lenses, several issues have been introduced. The mechanical characteristics of the various plastics now used for lenses are significantly different from glass. While glass may shatter more readily than plastic, glass is a much stronger material. Glass also experiences far less expansion and contraction with temperature. The common blocking materials also have significant expansion and contraction with temperature. As a result of these temperature variation characteristics, the bonding process introduces mechanical stress in the lens blank. With conventional blocking techniques it is common practice to wait 40 minutes to 1 hour after blocking a lens before proceeding to the surfacing process to allow much of the stress in the blocked lens blank to be reduced. Unfortunately, as the lens blank is surfaced it becomes thinner and weaker and more likely to deflect in response to the stresses introduced during the blocking process even if the aforementioned "time after blocking" was allowed to elapse prior for the blank to stabilize prior to surfacing. Depending upon the shape of the lens and the type of plastic lens blank, even small amounts of stress will result in lens distortions.

Typical blocking machines only support a specific diameter of the lens blank regardless of the diameter of the finished lens. The resulting lack of support at the edge of a lens blank can cause issues when positive power lenses are manufactured. The edges of these types of lenses are thinner than the center. With larger eyeglass frames the support problem for positive lenses worsens because with a larger frame comes a larger lens and the edge becomes thinner still. There are higher end blocking machines that address this problem automatically.

Surfacing outside the supported area on a thin plastic lens presents significant challenges and typically is associated with the introduction of lens flaws or premature de-blocking of the lens. De-blocking in this context is the separation of the lens blank from the blocking material and/or separation of the blocking material from the block. Premature de-blocking can occur when the cutting tool pushes into the unsupported area of the lens, the lens deflects, and the tool suddenly takes an overly aggressive cut into the lens blank. Such a cut in these conditions can produce forces beyond what the blocking material can withstand. It is not uncommon for experienced lab operators to introduce additional lens support structures during surface generation when they feel it is appropriate. These support structures are sometimes provided by the surfacing machine manufacturer. Unfortunately, this is a labor, and knowledge, intensive activity and too often occurs only after an unacceptable pair of lenses has had to be rejected or has prematurely de-blocked. Premature de-blocking is not an issue if conventional surfacing is being performed. However, lens distortion can still be introduced in the unsupported area of the lens blank.

Regardless of the method used to block a lens, the surfacing machine must know where the front surface is located. Without knowing this precisely the proper lens thickness cannot be achieved. It is a common occurrence using the most prevalent blocking equipment that lenses are produced with the incorrect thickness, This occurs as a result of the surfacing equipment erroneously expecting the front surface to be at a specific location. This occurs even when the blocking apparatus has been calibrated, Essentially anything that interferes with the spacing between the block and the blank in forming the blocking assembly, while the blocking material is solidifying, will cause a thickness problem in the finished lens. The most common practice of holding the lens blank in position and injecting hot liquefied blocking material between the lens blank and the block, requires that the block move toward the lens blank as the bonding or blocking material solidifies. If this motion is restricted uniformly the resulting finished lens will typically be too thin. Further, if the restriction is uneven (i.e., not radially symmetrical in its effect), the block will tilt which will result in the introduction of prism as well as thickness problems in the finished lens. The necessity that the block must move without restriction as the bonding or blocking material solidifies results in the need for diligent maintenance of the blocking apparatus and the blocks themselves which unfortunately does not always occur.

Laboratories that produce finished ophthalmic lenses typically have sophisticated lab management software (LMS). This software allows for job entry and establishes communication between the various pieces of equipment used in the laboratory. Unfortunately, present typical LMS software is not aware of, and does not communicate to, the surfacing equipment regarding the true position of the front surface of the lens blank, The surfacing equipment along with the LMS simply assumes it was blocked correctly and if this is not the case a thickness error will likely ensue for the reasons described above.

There is a need to improve lens blocking to avoid the issues discussed above that can detrimentally affect the final finished lens.

SUMMARY OF THE INVENTION

Proposed herein is a different method for blocking lenses that virtually eliminates the aforementioned problems associated with the prior art lens blocking techniques and a system for implementing the same.

The present invention provides a method and apparatus that virtually eliminates the stress introduced by the bonding of ophthalmic lens blanks, herein "blanks", to a holding device, typically metal, herein "block", by using a two-stage process. While other embodiments may form a lens blank front surface in the block itself, in this preferred embodiment the first stage creates a surface above the block in the blocking assembly that conforms to the front surface of the lens blank. In the second stage the lens blank is attached to the formed surface of the blocking assembly. In this embodiment, during the first stage the molten supporting material of the blocking assembly only takes a shape similar to the blank surface and is preferably contained within a flexible bladder of the blocking assembly intended to conform to the shape of the lens blank but does not bond the lens blank to the formed surface of the blocking assembly. In this embodiment, the second stage, after the blank supporting material has stabilized within the bladder forming a shaped blocking assembly wherein the bladder takes on the shape of the lens blank front surface, the lens blank is attached to the bladder of the blocking assembly. This requires a second bonding material to be used between the bladder and the lens blank. This forms a blocked lens blank assembly ready for surfacing.

In one embodiment of the invention a method of attaching ophthalmic lens blanks to a block assembly comprises the steps of shaping a block assembly to take the shape of an ophthalmic lens blank front surface, wherein the block assembly is not immediately attached directly to the ophthalmic lens blank during shaping of the block assembly; and following the shaping of the block assembly, attaching the lens blank to the shaped block assembly.

The method of attaching ophthalmic lens blanks to a blocking assembly according to one aspect of the invention may provide wherein the attaching of the lens blank to the shaped blocking assembly includes coupling the lens blank to the shaped blocking assembly with double sided tape, and wherein the double sided tape is secured to the lens blank and then pressed against the shaped blocking assembly. Alternatively, the method of attaching ophthalmic lens blanks to a blocking assembly according to one aspect of the invention may provide wherein the attaching of the lens blank to the shaped blocking assembly includes coupling the lens blank to the shaped blocking assembly with light cured adhesive, wherein the light cured adhesive is cured by light in the visible spectrum.

The method of attaching ophthalmic lens blanks to a blocking assembly according to one aspect of the invention may provide wherein the blocking assembly includes a moldable blocking material within a flexible bladder. Specifically, the moldable blocking material within the bladder may be a thermoplastic material and wherein the moldable blocking material is solidified during the shaping of the blocking assembly to take the shape of an ophthalmic lens blank surface. The term thermoplastic within this application defines a material that becomes softer and/or melts with the application of heat and then solidifies upon cooling. The thermoplastic blocking material of the present invention is preferably solid at ambient temperatures and at temperatures normally encountered in machining of lens blanks, such as wax and low melting temperature metal alloys.

The method of attaching ophthalmic lens blanks to a blocking assembly according to one aspect of the invention provides wherein the lens blank is pressed into the bladder during the shaping of the blocking assembly bladder of the blocking assembly, and wherein a barrier layer is positioned between the lens blank and the bladder during the shaping of the blocking assembly bladder of the blocking assembly. The barrier layer may be a nylon mesh material commonly used to form apparel such as stockings.

The method of attaching ophthalmic lens blanks to a blocking assembly according to the present invention may provide wherein part of the blocking assembly includes a metal block supporting the thermoplastic blocking material and elastic bladder, which may be rubber. The cooling of the metal portion of the blocking assembly may include a cooling fluid flowing over the metal block, such as over a rear face of the metal block. The method of attaching ophthalmic lens blanks to a blocking assembly according to the invention may include a temperature sensor within the moldable thermoplastic blocking material.

The method of attaching ophthalmic lens blanks to a blocking assembly according to the invention may further including the step of measuring the pressure placed upon the lens blank as it is being forced into the bladder during the shaping of the blocking assembly bladder of the blocking assembly, and may further including the step of melting the blocking material prior to shaping of the blocking assembly bladder of the blocking assembly and of reusing the blocking assembly, including the blocking assembly metal block and bladder with its thermoplastic material contained therein for a subsequent ophthalmic lens blank blocking.

One aspect of the present invention provides a system for minimal stress inducing ophthalmic lens blocking comprising a blocking assembly configured to take the shape of an ophthalmic lens blank front surface of an ophthalmic lens blank, the blocking assembly including a metal block, thermoplastic blocking material and a flexible bladder; a fluid cooled base supporting the blocking assembly; and a lens holding unit, moveable toward and away from the blocking assembly mounted on the base.

The system for minimal stress inducing ophthalmic lens blocking according to invention may further include stepper motor moving the lens holding unit and a pressure sensor measuring the pressure that a lens blank within the lens holding unit is exerting on the bladder. The system for minimal stress inducing ophthalmic lens blocking according to the invention may provide wherein the blocking assembly has an O-ring holding the flexible bladder to the block around the blocking material and a temperature sensor mounted to the block and which extends through the block into a space within the bladder containing the thermoplastic blocking material.

The lens blank is pressed into the bladder of the blocking assembly while the blank supporting material is liquid and held there until the blank supporting material solidifies. During this process the blank supporting material adheres to the inside of the bladder and the blank is prevented from attaching itself to the bladder.

In one embodiment of the present invention a thin flexible mesh is placed between the bladder and the blank until all the blank supporting material within the bladder solidifies. Only after the blank supporting material solidifies and has had enough time to stabilize is the blank attached to the bladder (stage two). In one embodiment of the invention the bladder is made of an elastomer or rubber or vinyl.

Another aspect of the present invention is a method by which the amount of blank area being supported for surfacing can be controlled. By the introduction of a block bladder assembly this embodiment allows for the blank to be pressed into the bladder by a variable amount. The further the blank is pressed into the bladder the greater area of the blank that will be supported. Using this method lenses will always be supported in areas where they are surfaced, which is presently often not the case in conventional lens blocking methods.

The apparatus used to press the lens blank into the bladder can determine precisely where the front surface of the blank is in respect to the block. In this embodiment this information is automatically sent to the surfacing equipment so it will know this location precisely, As discussed above, present practice assumes the blank has been blocked properly and assumes the front surface of the blank is in the proper position, and unfortunately, these assumptions are often incorrect.

The apparatus used to press the lens blank into the bladder is designed in such a way that the block remains stationary as the blank supporting material within the bladder solidifies, No longer is it required that the block be free to move as the bonding material hardens, as in conventional blocking methods.

The features that characterize the present invention are pointed out with particularity in the claims which are part of this disclosure. These and other features of the invention, its operating advantages and the specific objects obtained by its use will be more fully understood from the following detailed description and the operating examples.

BRIEF DESCRIPTION OF THE FIGURES

FIGS. 3A-C schematically illustrate an automated system for implementing the method of minimal stress inducing ophthalmic lens blocking according to one embodiment of the present invention

DESCRIPTION OF THE PREFERRED EMBODIMENTS

Figure 1A:
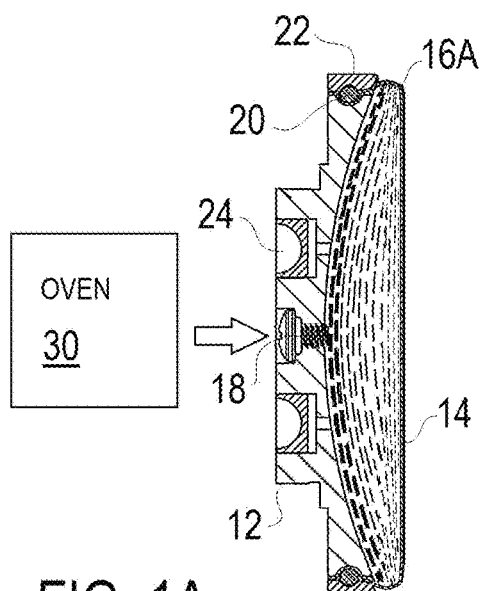
FIGS. 1A-1E schematically illustrate the method of minimal stress inducing ophthalmic lens blocking according to one embodiment of the present invention.
Figure 1B:
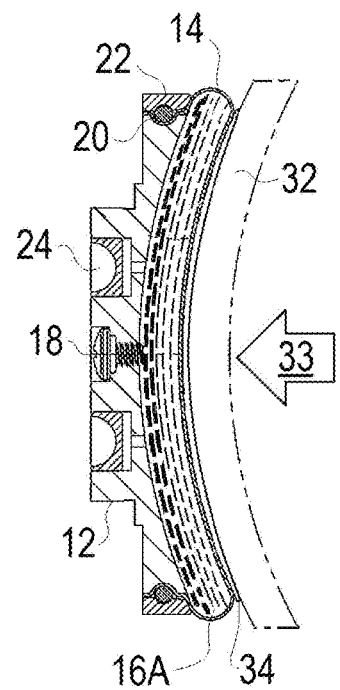
Figure 1C:
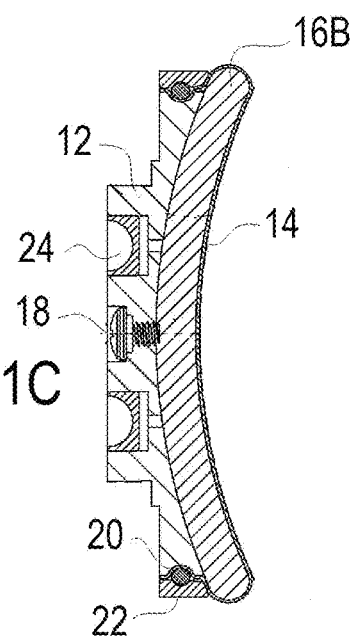
Figure 1D:
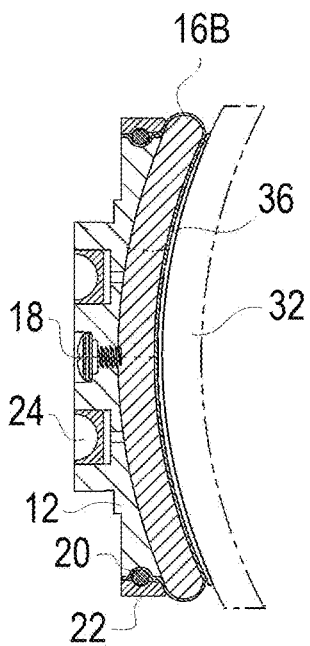
Figure 1E:
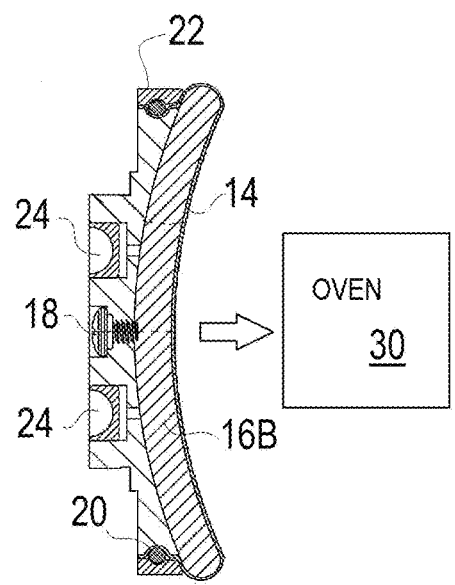

While there are many ways to implement the two-step, or two stage, method according to the present invention, including automated approaches using system 40, below describes the present preferred embodiment, FIGS. 1A-1E schematically illustrate the method of minimal stress inducing ophthalmic lens blocking according to one embodiment of the present invention. The first stage, generally referenced as the block forming or blocking assembly shaping stage, of the two-stage process is generally shown in FIGS. 1A through 1C while the second stage, generally referenced as the lens mounting stage, is shown in FIGS. 1C through 1E. FIG. 1C can be considered to illustrate the end of the first stage and the beginning of the second stage as discussed below and is an illustration of the components forming a blocking assembly within the meaning of the present invention. The term block in this application references the block 12 that is generally known in the art, while the phrase "blocking assembly" references the block 12 and associated components that allow it to be shaped to and coupled to the lens blank 32, as shown best in FIGS. 1 1A, 1C and 1E.

FIG. 1A illustrates a blocking assembly including a block 12 with flexible bladder 14 and liquid blocking material 16A coming from an oven 30 that is used to liquefy the blocking material 16A. The shape of the flexible bladder 14 is exaggerated for illustrative purposes in FIG. 1A to illustrate that it does not yet have the shape of the lens 32. The change of shape and the thermal contraction may not be to the degree shown in these figures which are purely schematic. The block 12 may be formed from steel or other conventional material for a lens holding block.

The blocking material (Liquid state 16A and solid state 16B) is preferably a wax, but a low melting metal alloy may also be used. Generally, 30-50 grams of bonding wax can form the blocking material 16A and/or 16B. The weight of the metal alloy version of the blocking material would vary based upon the density of the metal alloy relative to the wax as the resulting volume of blocking material 16B would be similar when using alloy. The blocking material 16A and 16B is a moldable material and is, preferably, a thermoplastic material, meaning that it is a material, which becomes softer when heated (and liquefies above the melting temperature) and hard or solidified when cooled, Thermoplastic materials can be cooled and heated many times without any change in their chemistry or mechanical properties provided they are kept from contamination. Being enclosed in the bladder provides protection from contamination. When thermoplastics are heated to their melting point, they melt to a liquid, which is preferred in the present method. The term thermoplastic does not define, or is not limited to, what is conventionally called plastics or polymers, and in fact the preferred blocking materials of wax and metal alloys are not plastics, however suitable thermoplastic polymers could also be used. On the broadest level the blocking material may be considered as moldable, and in the thermoplastic materials that are preferred they are moldable when heated. Other moldable materials that set to a hardened condition, such as a curable material could be used, but the thermoplastic materials disclosed is preferred.

The flexible bladder 14 may be a thin elastomer or rubber or even vinyl, generally between about 0.005"-0.20" and extends over the block 12 and the blocking material 16A and/or 16B and is held in by an O-ring 20 in a groove in the block 12 that is surrounded by a support ring 22.

The blocking assembly of the invention, including the block 12, blocking material 16A and/or 16B, the bladder 14, vent seal 18, O-ring 20, support ring 22, block pins 24 and sensor 25, may be formed by a number of manufacturing processes, however an efficient one is to measure the proper amount (typically 30-50 grams of wax) blocking material 16B (solid form) and place the solid material 16B on block 12. Then in the assembly process the bladder 14 is stretched over block 12 and the O-ring 20 and support ring 22 are positioned to hold the bladder 14 in place. The blocking assembly is turned upside down and the vent seal 18 is removed. The assembly is heated, thereby melting the blocking material 16A (now a liquid) and air is allowed to escape the vent until all air escapes and blocking material 16A starts to come out vent hole. The vent seal 18 is replaced to seal the inside of the bladder 14 with only blocking material 16A remaining therein (no air).

Figure 2:
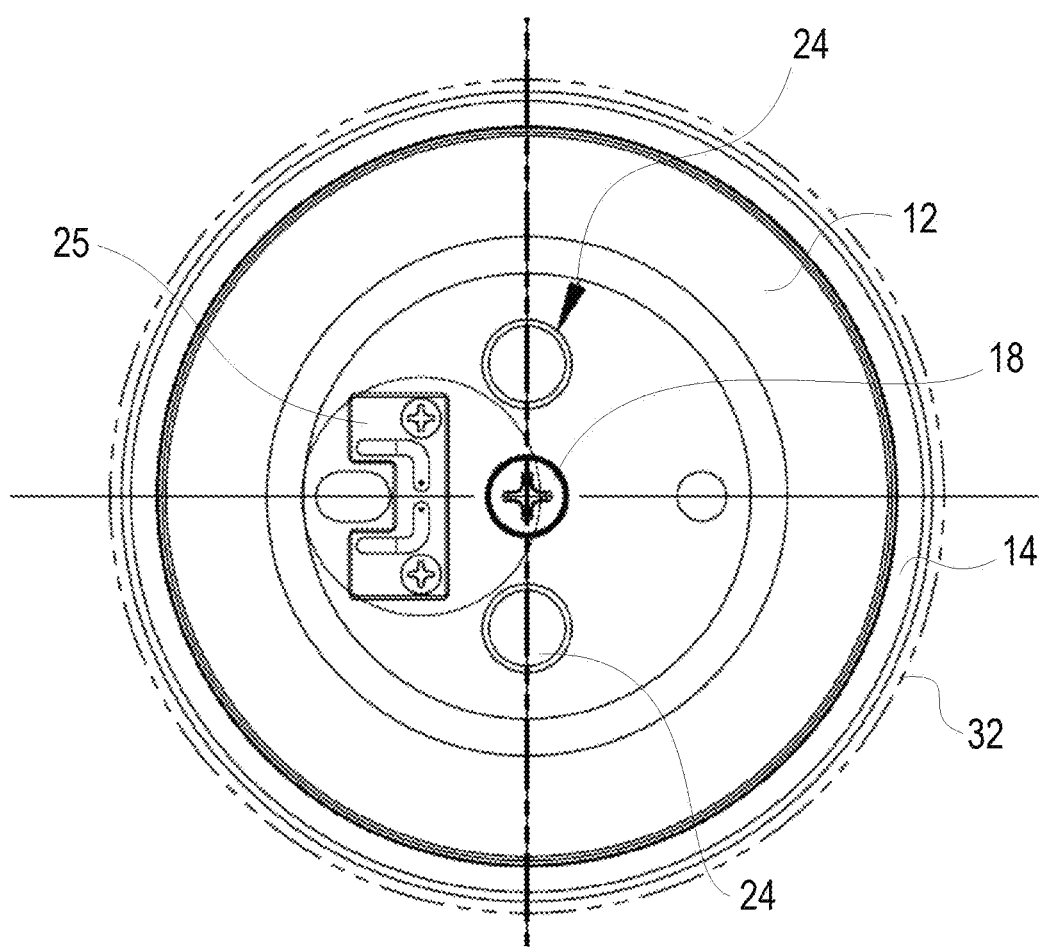
FIG. 2 illustrates a rear surface of a block used in the method of FIGS. 1A-E.

The blocking assembly includes block pins 24 in block 12 that are used in some lens machining operations and are conventional. Further shown in FIG. 2, the blocking assembly includes a temperature sensor 25 mounted to the block 12 and which extends through the block 12 into the space within the bladder 14 containing the blocking material 16A and/or 16B. The sensor 25 allows the system of the invention to know the state of the blocking material 16A or 16B.

The blocking assembly with liquefied blocking material 16A taken from oven 30 and is mounted in the system 40 discussed below that allows for precise implementation, control and automation of the process. In the initial block forming stage of the method of the present invention the lens blank 32 to be mounted is pressed, with a controllable pressure 33 (discussed below) against the bladder 14 with the liquefied blocking material 16A to precisely form the blocking assembly.

A thin mesh material 34, such as a nylon mesh, is interposed between the lens 32 and the bladder 14 to avoid stress or pressure build up in the lens 32. The mesh material 34 will minimize the inducement of stress into the lens 32 due to several different aspects. The mesh material 34 will prevent a vacuum from forming between the cooling bladder 14 and the lens 32 that will minimize the inducement of stress into the lens 32. The mesh material 34 acts as a thermal barrier that will minimize the inducement of thermal stress into the lens 32. As the bladder 14 shrinks or moves due to cooling the mesh material 34 allows this repositioning in a manner (e.g., allows for relative lateral type movement) that will minimize the inducement of stress into the lens 32. Essentially the mesh material 34 acts to prevent the bladder 14 from "gripping" the lens 32 or excessively heating the lens 32 during block formation. As discussed below during the formation of the blocking assembly the proper pressure 33 is maintained on the lens 32 and it can move toward the bladder 14 as needed to maintain the pressure.

Once the blocking material 16B has solidified the lens 32 is backed away from the formed blocking assembly as shown schematically in FIG. 1C. The sensor 25 allows the system 40 (and operators) of the present invention to know exactly when the blocking material 16B has solidified. The method then moves to the lens mounting stage in which a coupling element 36, such as a visible light cured adhesive (or double sided tape in an alternative embodiment), is applied to the lens 32 and the lens 32 is mounted to the formed blank assembly by bonding to the bladder 14 as generally shown in FIG. 1D. In the preferred embodiment the coupling element 36 is a visible light cured adhesive of an amount of about 0.1 to 5 gram of material forming a layer of about 0.001" to 0.05" The use of visible light cured adhesive allows the adhesive layer of coupling element 36 to be cured through the lens 32 with visible light. The particular wavelengths of light that are used to cure the adhesive can vary depending upon the adhesive, but using a curing wavelength in the visible range assures the curing light wavelengths will pass through the lens 32, as lenses often include UV absorption that would make UV curable coating ineffective.

The blocked lens 32 shown in FIG. 1D is machined in a conventional or free-form fashion and the processed lens 32 is removed from the formed blocking assembly. The blocking assembly may be wiped to remove any residual adhesive (or residual of double sided tape), and the formed block can be returned to the oven 30 to liquefy or melt the blocking material 16B and allow the process to start over for the next lens 32 of whatever configuration. The method of the present invention is suitable for all lens types including non-spherical lens, such as line bifocal lens and front surface progressives. It is understood that the clamping mechanism shown schematically herein and discussed below does not expressly allow for the rotational and translational requirements needed for properly blocking line bifocals and front progressives. Those versed in the art understand that the clamping mechanism can be appropriately engineered to accommodate this requirement and include an optical system to assist the operator.

The system 40 shown schematically in FIGS. 3A-C allows for automated implementation of the method of minimal stress inducing ophthalmic lens blocking according to one embodiment of the present invention. The system 40 is described below and includes a lens holding unit 42, a clamping mechanism 44, and includes lens holding elements 46 engaging the edge of a lens, with the unit 42 movable on a slide 48 through a stepper motor 50. A load cell 52 can measure the force to maintain the desired pressure 33 exerted on or through the lens 32. The blocking assembly is mounted in cooling base housing 54 below the unit 42. The cooling base 54 includes channels therein that are in contact with the opposite face of the metal block 12 and the base 54 can be coupled to a source of cooling fluid, typically tap water.

During this first stage of the two-stage process, the lens 32 is not being bonded to the bladder 14 of the blocking assembly. As part of this stage, lens 32 is simply placed on the lens holding unit 42 and then manually centered and held by rotating the two handles (not numbered). This holding unit 42 has a ratchet 44 as noted above and the three holding elements 46 exert increasing force on the edge of the lens 32 as the holding unit 42 is rotated clockwise. The three holding elements 46 are spring-loaded to ensure a ratchet position can be reached.

Once the lens 32 is held in place the operator places the flexible mesh barrier 34 between the lens 32 and the bladder 14 whose purpose is to prevent any potential adhesion of the lens 32 to the bladder 14 by vacuum during this block formation stage.

Once this barrier 34 is in place, the automated completion of stage one is begun by initiating the "Form" function. When this function is activated the lens 32 will automatically be driven down into the bladder 14, by the stepper motor 50 ball-screw drive, to a position predetermined by the finished lens size. The position will be precisely known by the number of steps being delivered to the stepper motor. The split ring of the unit 42 will separate as the lens 32 descends toward the bladder. This position supports the lens 32 over essentially all the finished lens area. Once the lens 32 is in position (schematically shown in FIG. 1B), a cooling liquid (such as tap water) will enter the housing 54 around the block 12. This will continue for a period of time determined by the temperature of the material. When the liquefied material 16A is known to be solidified 16B within the bladder 14 the cooling liquid will be removed. The housing 54 includes cooling channels to be in contact with the block 12 essentially cooling the liquid material 16A evenly across the metal block 12. Metal allows the cooling to proceed rapidly and the sensor 25 allows the system 40 to know when it has been completed.

It is understood, that if both the lens 32 and bladder 14 are simply held in position, the contraction of the liquefied material 16A during cooling (solidification) within the bladder 14 would cause the bladder 14 to move away from the lens 32. In this first stage, the inside of the bladder 14 is bonded to the block 12 via the solidified blocking material 16B. In the second stage, the lens 32 is bonded to the bladder 14. To achieve proper blocking in the second stage the bladder 14 of the formed block must represent an accurate match to the front surface of the lens 32. The bladder 14 with its liquefied material 16A within during the formation stage, is forced to hold the shape of the lens 32 as liquefied material 16A solidifies by maintaining pressure 33 on the lens 32 by pushing it into the bladder 14, The barrier 34 thickness between the lens 32 and the bladder 14 in the first stage compensates for any remaining shape distortion by matching the thickness of the barrier to the bond line created by the double-sided tape or adhesive in the second step.

Pressure 33 is maintained by rotating the motor ball screw drive as the liquefied material 16A solidifies. The amount of force being applied is measured by the load cell 52 and maintained at the desired amount. In order to achieve appropriate pressure 33, the amount of force being applied is a function of the size of the finished lens area being supported.

Once enough time has passed for the liquefied material 16A to solidify to material 16B within the bladder 14 the motor ball screw drive 50 lifts the lens 32 away from the bladder 14 (shown generally in FIG. 1C). The operator then removes the barrier 34. This completes stage one.

In this embodiment either of two approaches are used to execute step two. One is to use double sided tape as material 36 to secure the lens 32 and place the tape between the lens blank 32 and the bladder 14, The industry has long used blocking tape to protect the front surface of lenses while they are being processed. The taping is a process and equipment which is familiar to the industry, With the lens 32 and material 36 held the operator then executes the "Block" function upon which the lens 32 will descend into the bladder 14 with the tape in between with a force established by the program and measured by the load cell 52.

The second approach, and preferred approach, is to apply a visible light cured adhesive as material 36 to both the lens 32 and the bladder 14 (or possibly one or the other). In this embodiment the adhesive takes approximately 10-20 seconds to set up or cure once exposed to the proper visible light (the curing length can vary with adhesive and lens blank material). With the lens 32 held by unit 42 and with the adhesive applied the "Block" function is executed. The stepper motor ball drive 50 then drives the lens blank 32 into the bladder with the purpose of dispersing the adhesive to the correct thickness across the entire interface between the lens blank 32 and the bladder 14. Following curing of the adhesive material 36 the lens 32 is now bonded to the bladder 14. The stepper motor ball drive 50 lifts the entire assembly, including the block 12, vertically. The operator places their hand under the block 12 and releases the ratchet. The block and blank assembly may immediately brought to the surfacing area for further processing.

Benefits of the Invention

The method and its apparatus or system 40 provide several important improvements over existing blocking methods: The method reduces the stress created by thermal contraction of the bonding material and thereby reduces the likelihood of lens distortions. There is no waiting time after blocking to allow stress to diminish. The method increases the support area of the lens blank prior to surfacing without introducing additional hardware. This reduces the likelihood of lens distortion or premature de-blocking, The method allows the surfacing equipment to be adjusted based upon the true position of the lens blank's front surface. No assumption need be made about front surface position as is presently the case with current lens blocking technologies. With the bladder containing the bonding material in a sealed environment lab contamination and the handling of hazardous material is eliminated.

It will be apparent to those of ordinary skill in the art that various modifications may be made to the present invention without departing from the spirit and scope thereof, The scope of the invention is not to be limited by the illustrative examples described above. While the invention disclosed herein has been specifically discussed as to the impact on ophthalmic lens blocking, lens is not used for ophthalmic purposes most certainly would benefit from this invention and are so envisioned.

What is claimed is:

1. A method of attaching ophthalmic lens blanks to a blocking assembly comprises the steps of :
    shaping a blocking assembly to take the shape of an ophthalmic lens blank surface of an ophthalmic lens, wherein the blocking assembly is not attached directly to the ophthalmic lens blank during shaping of the blocking assembly; and
    following shaping the blocking assembly, attaching the lens blank to the shaped blocking assembly, wherein the blocking assembly includes a moldable blocking material within a flexible bladder, and
    wherein the moldable blocking material is solidified during the shaping of the blocking assembly to take the shape of an ophthalmic lens blank surface of an ophthalmic lens.

2. The method of attaching ophthalmic lens blanks to a blocking assembly according to claim 1, wherein the lens blank is pressed into the bladder during the shaping of the blocking assembly.

3. The method of attaching ophthalmic lens blanks to a blocking assembly according to claim 2, wherein a barrier layer is positioned between the lens blank and the bladder during the shaping of the blocking assembly.

4. The method of attaching ophthalmic lens blanks to a blocking assembly according to claim 3, wherein the barrier layer is nylon mesh.

5. The method of attaching ophthalmic lens blanks to a blocking assembly according to claim 1, wherein the moldable blocking material is one of wax or a metal alloy.

6. The method of attaching ophthalmic lens blanks to a blocking assembly according to claim 5, wherein the blank assembly is cooled to solidify the moldable blocking material.

7. The method of attaching ophthalmic lens blanks to a blocking assembly according to claim 5, wherein the blocking assembly includes a metal block supporting the blocking material and bladder, and wherein the cooling of the blocking assembly blocking assembly includes a cooling fluid flowing over the metal block.

8. The method of attaching ophthalmic lens blanks to a blocking assembly blocking assembly according to claim 7, wherein the blocking assembly includes a temperature sensor within the moldable blocking material.

9. The method of attaching ophthalmic lens blanks to a blocking assembly according to claim 8, further including the step of measuring the pressure placed upon the lens as it is being forced into the bladder during the shaping of the blocking assembly.

10. The method of attaching ophthalmic lens blanks to a blocking assembly according to claim 9, further including the step of melting the blocking material prior to shaping of the blocking assembly.

11. The method of attaching ophthalmic lens blanks to a blocking assembly according to claim 10, comprising the step of reusing the blocking assembly for a subsequent ophthalmic lens blank.

12. A method of attaching ophthalmic lens blanks to a blocking assembly comprises the steps of:
   shaping a blocking assembly to take the shape of an ophthalmic lens blank surface of an ophthalmic lens, wherein the blocking assembly is not attached directly to the ophthalmic lens blank during shaping of the blocking assembly, wherein the blocking assembly includes a moldable blocking material within a flexible bladder, wherein the moldable blocking material is solidified during the shaping of the blocking assembly to take the shape of an ophthalmic lens blank surface of an ophthalmic lens; and
   attaching the lens blank to the shaped blocking assembly.

13. The method of attaching ophthalmic lens blanks to a blocking assembly according to claim 12, wherein the lens blank is pressed into the bladder during the shaping of the blocking assembly, and wherein a nylon barrier layer is positioned between the lens blank and the bladder during the shaping of the blocking assembly.

14. The method of attaching ophthalmic lens blanks to a blocking assembly according to claim 12, wherein the moldable blocking material is one of wax or a metal alloy, and wherein the blank assembly is cooled to solidify the moldable blocking material.

\* \* \* \* \*